US006561455B2

United States Patent
Capanna

(10) Patent No.: US 6,561,455 B2
(45) Date of Patent: May 13, 2003

(54) VERTICAL TAKE-OFF AND LANDING, AERODYNAMICALLY SELF-SUSTAINED HORIZONTAL FLIGHT HYBRID AIRCRAFT

(76) Inventor: Franco Capanna, Via Quarto Peperino 30, 00188 Rome (IT)

( * ) Notice: Subject to any disclaimer, the term of this patent is extended or adjusted under 35 U.S.C. 154(b) by 0 days.

(21) Appl. No.: 10/179,978

(22) Filed: Jun. 26, 2002

(65) Prior Publication Data

US 2003/0006339 A1 Jan. 9, 2003

Related U.S. Application Data

(63) Continuation-in-part of application No. 09/581,318, filed as application No. PCT/IT98/00356 on Dec. 9, 1998, now abandoned.

(51) Int. Cl.[7] ............................................... B64C 27/22
(52) U.S. Cl. ........................ 244/7 R; 244/7 A; 244/7 B
(58) Field of Search ................................. 244/7 A, 7 B, 244/7 R, 7 C, 23 B, 17.17, 17.19, 12.4

(56) References Cited

U.S. PATENT DOCUMENTS

| | | | |
|---|---|---|---|
| 1,686,080 A | 10/1928 | Ford | |
| 2,397,632 A | 4/1946 | Stuart | |
| 2,665,082 A | * 1/1954 | Anderson | .................... 244/7 B |
| 2,668,026 A | 2/1954 | Price | |
| 2,750,133 A | * 6/1956 | Lebold | .................... 244/100 R |
| 2,825,514 A | 3/1958 | Focke | |
| 3,582,021 A | 6/1971 | Pender | |
| 3,606,210 A | 9/1971 | Busby | |
| 3,647,315 A | * 3/1972 | Rostad et al. | .................. 416/31 |
| 3,693,910 A | * 9/1972 | Aldi | ........................... 244/7 A |
| 3,823,898 A | 7/1974 | Eickmann | |
| 4,793,572 A | 12/1988 | Mecca | |
| 5,370,341 A | 12/1994 | Leon | |
| 5,765,783 A | * 6/1998 | Albion | ....................... 244/7 B |
| 5,810,289 A | 9/1998 | Sager | |
| 6,129,306 A | 10/2000 | Pham | |

FOREIGN PATENT DOCUMENTS

| | | |
|---|---|---|
| DE | 44 05 975 | 8/1995 |
| FR | 1180818 | 6/1959 |
| FR | 1 180 818 | 6/1959 |
| FR | 2 619 354 | 2/1989 |

* cited by examiner

Primary Examiner—Michael J. Carone
Assistant Examiner—Gabriel S Sukman
(74) Attorney, Agent, or Firm—Young & Thompson

(57) ABSTRACT

An vertical take-off and landing (VTOL) and horizontal flight (HF) aircraft has a fuselage with wings providing lift during horizontal flight, a rotor on the nose of the fuselage that is stowable during horizontal flight, a first pair of ducted fan propellers on the wings, a second pair of tiltable ducted fan propellers adjacent to the tail, a hydraulic system powered by the main engine and generating propulsive hydraulic power for the rotor system and the first and second pairs of propellers. A control system for the hydraulic system provides propulsive hydraulic power to the rotor system and to the second pair of propellers during vertical take-off and landing and not to the first pair of propellers during vertical take-off and landing and provides propulsive power to the first and second pairs of propellers during horizontal flight and not to the rotor system during horizontal flight.

7 Claims, 4 Drawing Sheets

VERTICAL TAKE-OFF AND LANDING, AERODYNAMICALLY SELF-SUSTAINED HORIZONTAL FLIGHT HYBRID AIRCRAFT

THIS APPLICATION IS A CONTINUATION IN PART OF Ser. No. 09/581,318 FILED Jun. 12, 2000 now abandoned, which is a 371 of PCT/IT98/00356 filed Dec. 9, 1998.

BACKGROUND OF THE INVENTION

The present invention relates to a vertical take-off and landing, aerodynamically self-sustained horizontal flight hybrid aircraft.

As is well known, a main advantage of vertical take-off and landing aircraft, also known as VTOL, is the capability of reaching almost anywhere, regardless of the size of the landing area. This advantage is counterbalanced by the high operating costs of the existing VTOL technology, particularly helicopters, with respect to the other vehicles and transportation systems. Increased costs are due to the very high amount of power necessary to sustain the helicopter during its horizontal flight, in view of the absence of aerodynamic sustaining thrust of the fixed wings that are provided in traditional horizontal flight (HF) aircraft.

Two models of aircraft are provided with interchangeable integrated VTOL-HF characteristics, namely the Harrier and the V-22 Osprey. The Harrier is a military jet aircraft made in Great Britain by a British Aerospace and McDonnel Douglas joint-venture. The Osprey is a military turbo-prop aircraft, providing a tiltable rotor-engine group made in the United States by Bell Textron and Boeing.

Harriers are provided with VTOL capability by rotating downward the thrust of its main jet engines during the take-off and landing. Ospreys rotate the main engines at the ends of the wings to provide the relevant thrust in the VTOL and HF modes. Thrust for the Osprey is based on a compromise between big propellers and rotor blades since the engines work in both the HF and VTOL modes.

Both solutions concern aircraft particularly designed to be used as VTOL-HF aircraft. However, the main engines are sized on the basis of the maximum thrust necessary for VTOL, with a consequent impact on the operating costs.

A hydraulic drive for synchronously driving a pair of interleaved propellers in a conventional HF aircraft is disclosed in Sager, U.S. Pat. No. 5,810,289. However, the hydraulic system does not operate so that hydraulic power is alternately provided to different types of propulsion systems that separately provide propulsion for VTOL and HF modes of operation and thus is not sufficiently robust for VTOL-HF operation.

SUMMARY OF THE INVENTION

A main object of the present invention is that of realizing a new vertical take-off and landing, aerodynamically self-sustained horizontal flight hybrid aircraft (VTOL-HF) with an improved propulsion system that avoids the problems of the prior art.

The solution suggested according to the present invention is an aircraft with a fuselage with a pair of wings providing lift during horizontal flight, a main engine carried by the fuselage, a rotor system on the nose of the fuselage providing lift during vertical take-off and landing, the rotor system having at least one rotor that is structured and arranged to be stowed in the fuselage during horizontal flight, a first pair of ducted fan propellers mounted on the wings, a second pair of ducted fan propellers mounted adjacent to a tail of the fuselage, the second pair of ducted propellers being tiltable to vary a direction of thrust, a hydraulic system powered by the main engine, the hydraulic system being connected to and generating propulsive hydraulic power for the rotor system and the first and second pairs of ducted fan propellers, and a control system for controlling the hydraulic system. The control system provides propulsive hydraulic power to the rotor system and to the second pair of ducted fan propellers during vertical take-off and landing and not to the first pair of ducted fan propellers during vertical take-off and landing and provides propulsive power to the first and second pairs of ducted fan propellers during horizontal flight and not to the rotor system during horizontal flight.

BRIEF DESCRIPTION OF THE DRAWINGS

The present invention will be now described, for illustrative but not limitative purposes, according to its preferred embodiments, with particular reference to the figures of the enclosed drawings, wherein.

DESCRIPTION OF THE PREFERRED EMBODIMENTS

Figure 1:
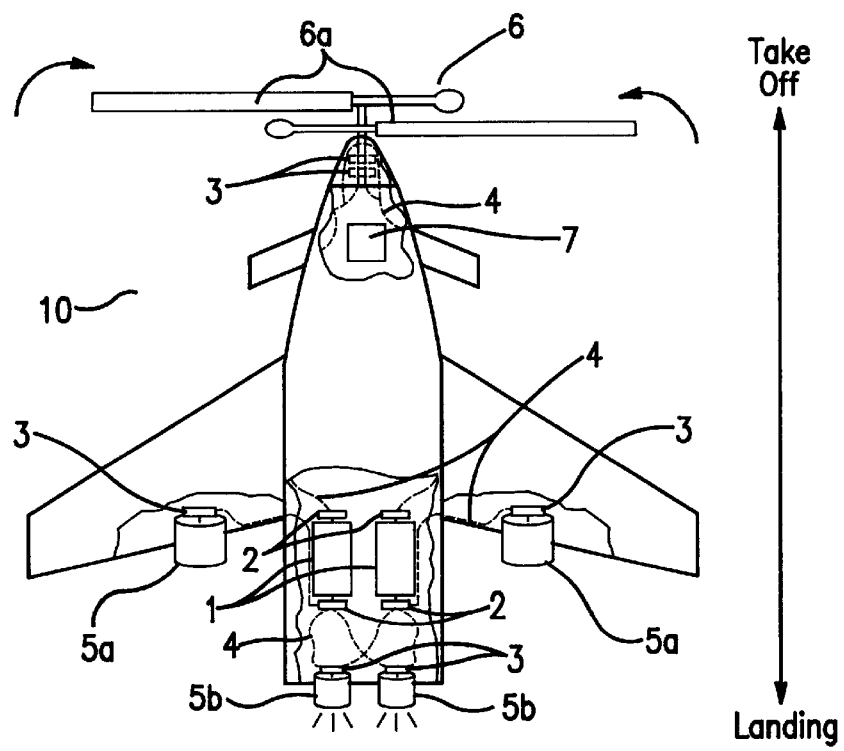
FIG. 1 is a schematic view of a first embodiment of an aircraft according to the invention.

In FIG. 1, an aircraft 10 according to the invention includes at least one main engine 1 that is a source of power for hydraulic pumps 2. Hydraulic pumps 2 provide propulsive power for the hydraulically powered engines 3 that operate the aircraft propulsion systems by means of hydraulic lines 4 that extend from pumps 2 to engines 3.

Figure 2:
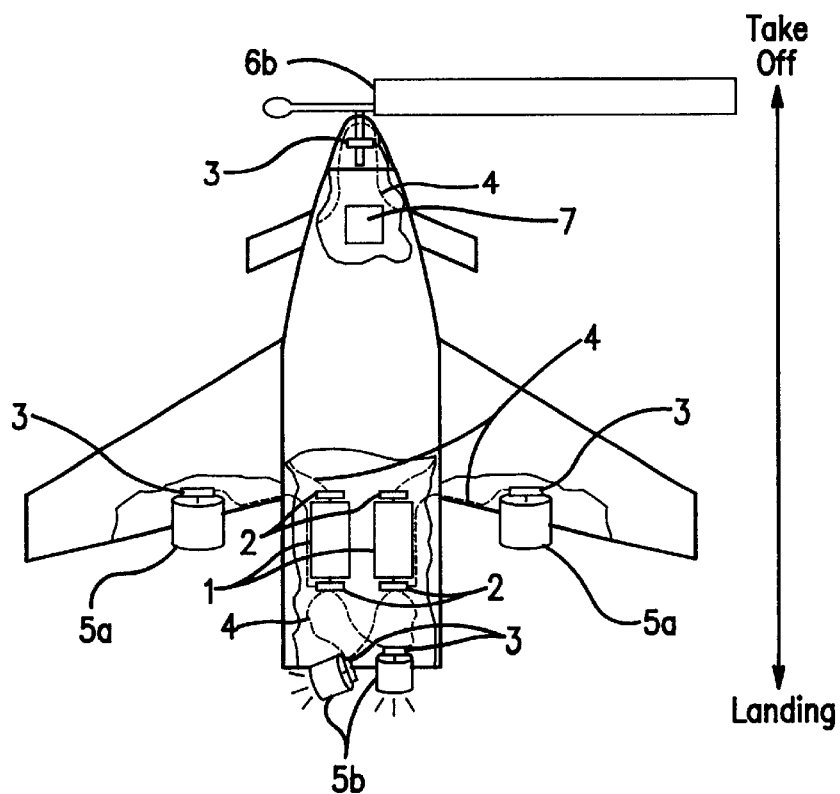
FIG. 2 is a schematic view of a second embodiment of an aircraft according to the invention.

The aircraft propulsion systems include a rotor system 6 with two counter-rotating rotors 6a in FIG. 1 or one rotor 6b in FIG. 2, a first pair of ducted fan propellers 5a mounted on the respective wings of aircraft 10, and a second pair of ducted fan propellers 5b mounted adjacent to the tail of aircraft 10. Rotor system 6, and first and second ducted fan propellers receive propulsive power from hydraulic pumps 2 through hydraulic lines 4.

The embodiment of FIG. 2 in which only one rotor 6b is provided includes a pair of ducted fan propellers 5c that are mounted adjacent to the tail of the aircraft and that are tiltable relative a longitudinal axis of the aircraft fuselage to resist the torque effect of the single rotor 6b. Of course, such tiltable propellers can also be provided in the embodiment of FIG. 1.

Figure 3:
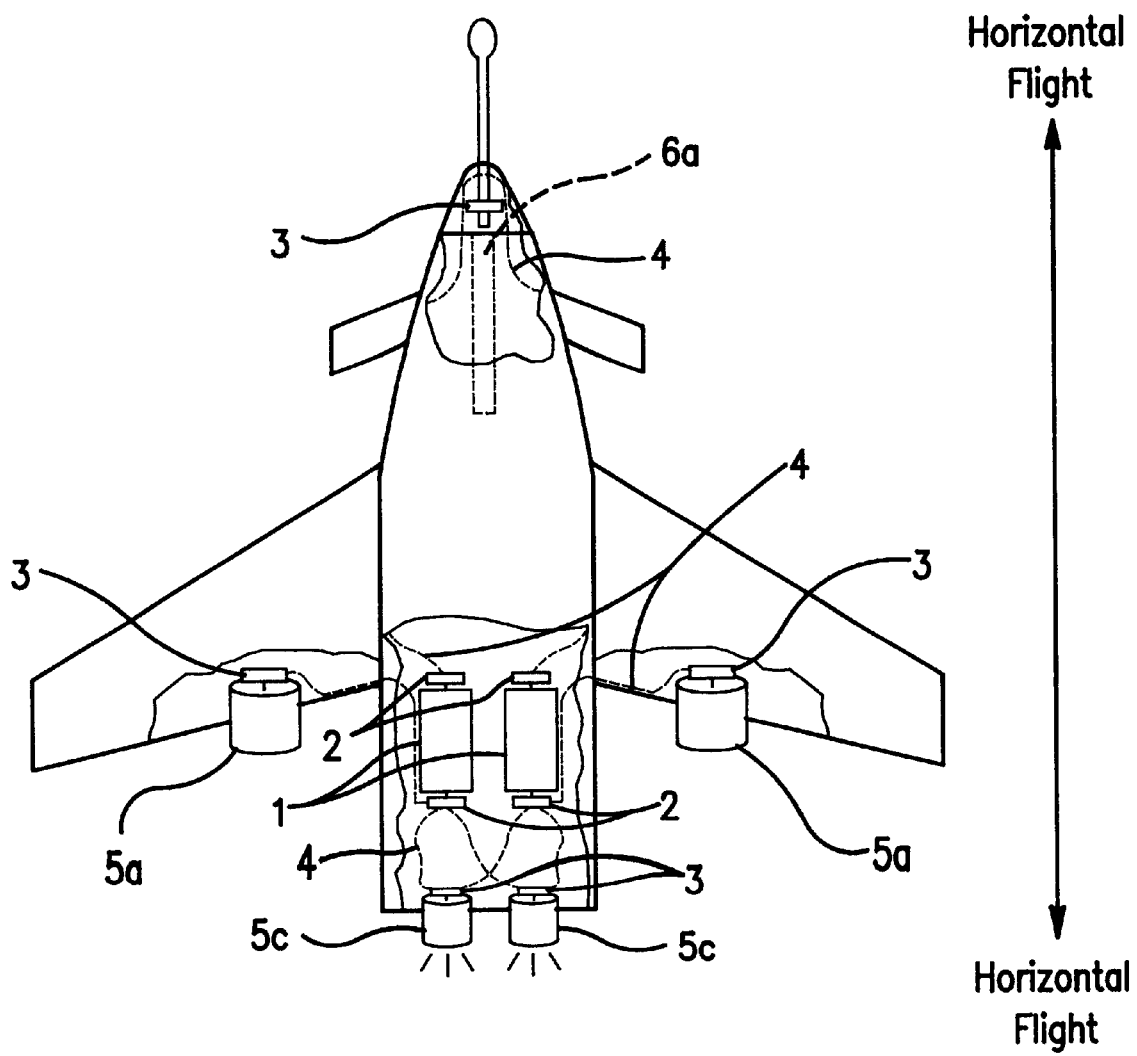
FIG. 3 is a schematic view of the second embodiment with the rotor stowed in the fuslage.

Rotors 6a and 6b provide vertical lift when the vehicle is in the vertical attitude and are structured and arranged to be stowed in the fuselage during horizontal flight, such as shown in FIG. 3.

The aircraft also includes a control system 7 that controls operation of hydraulic pumps 3 and hydraulic lines 4. Lines 4 can include suitable valves for routing the flow of hydraulic fluid under the control of control system 7. Control system 7 may be suitably located in the fuselage. Control system 7 sends control signals to appropriate valves to provide propulsive hydraulic power to rotor system 6 and to second pair of ducted fan propellers 5b/c during vertical take-off and landing and not to first pair of ducted fan propellers 5a during vertical take-off and landing and to provide propulsive hydraulic power to the first and second pairs of ducted fan propellers 5a/b/c during horizontal flight and not to rotor system 6 during horizontal flight.

That is, control system 7 transfers power alternately from the rotor system to the ducted fan propellers as needed for the mode of flight. This arrangement ensures that adequate power will be available in both VTOL and HF modes while maintaining an acceptable weight-to-power ratio.

Figure 4:
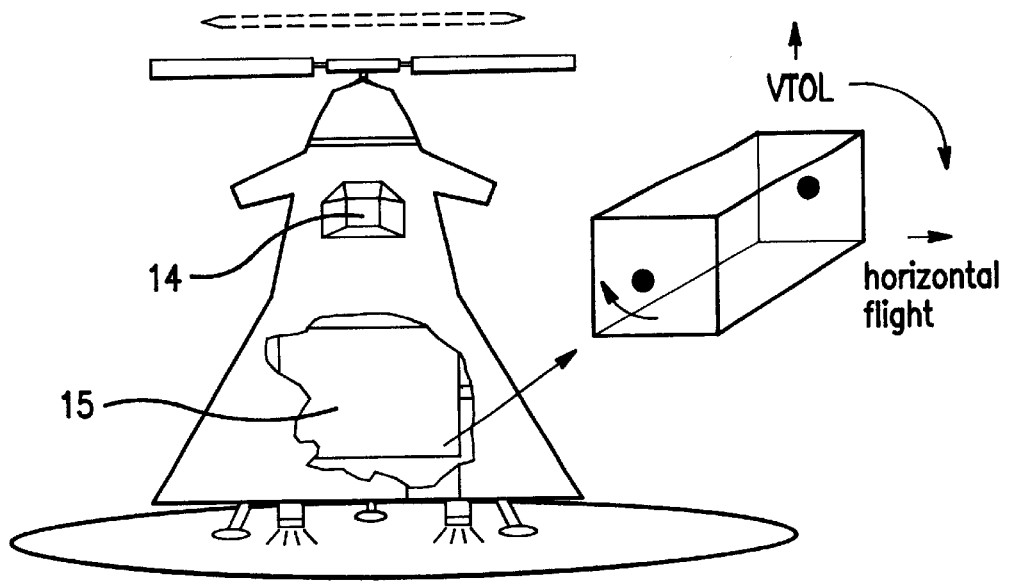
FIG. 4 is a schematic view of a further embodiment of an aircraft according to the invention.
Figure 5:
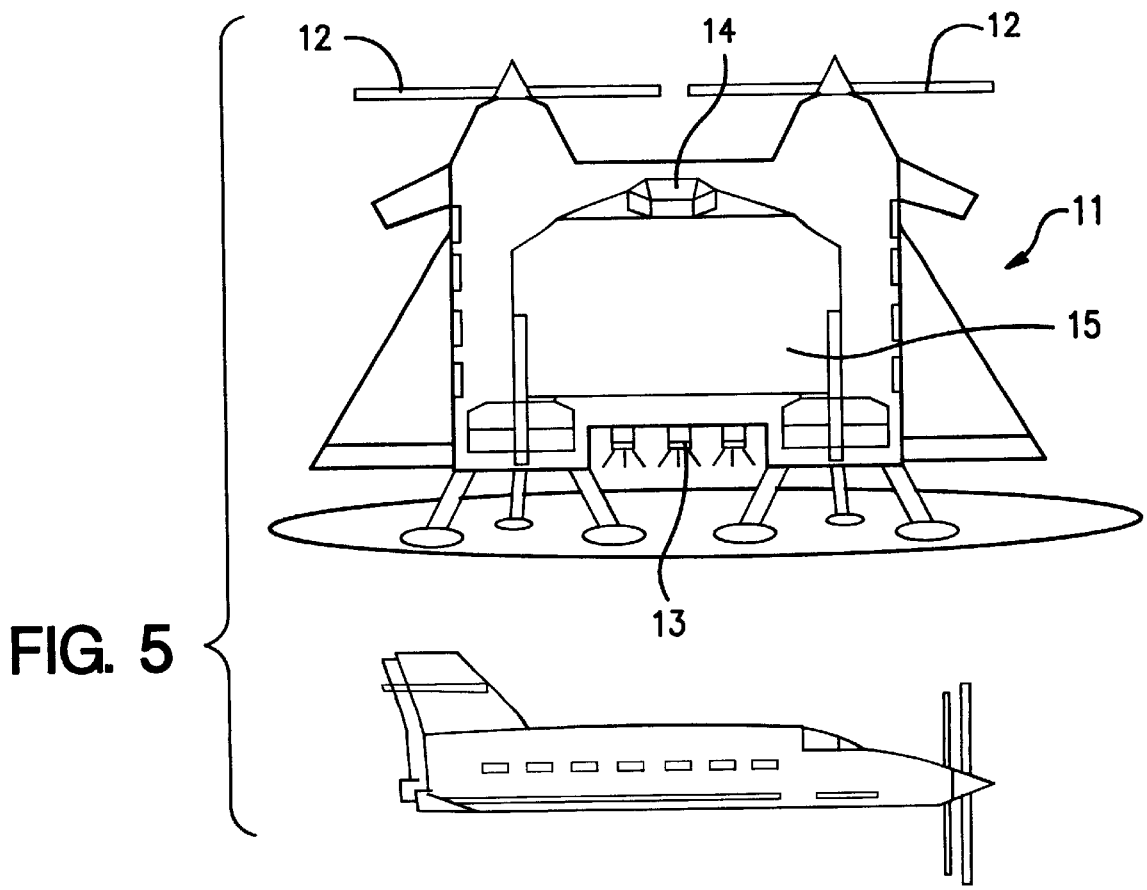
FIG. 5 is a schematic view of yet a further embodiment of an aircraft according to the invention, FIG. 6 schematically shows the different situation of take-off, landing, and takeoff of the aircraft according to the invention.

In further embodiments, and with reference to FIG. 4, the aircraft can also include a swingable piloting cabin 14 and/or a module 15 for passengers or freight, which is also swingable. The embodiment schematically shown in FIG. 5 shows a passenger aircraft 11 with two rotor blades 12. Ducted fan propellers 13 are provided behind the aircraft cabin.

The pilot cabin 14 and passenger area 15 of the aircraft are tiltable modules maintaining the horizontal position of the floor and the ceiling parallel with respect to the ground during any flying phase, from take-off to the transition to horizontal flight, thus avoiding problems for the pilots, the passengers or the freight.

Figure 6:
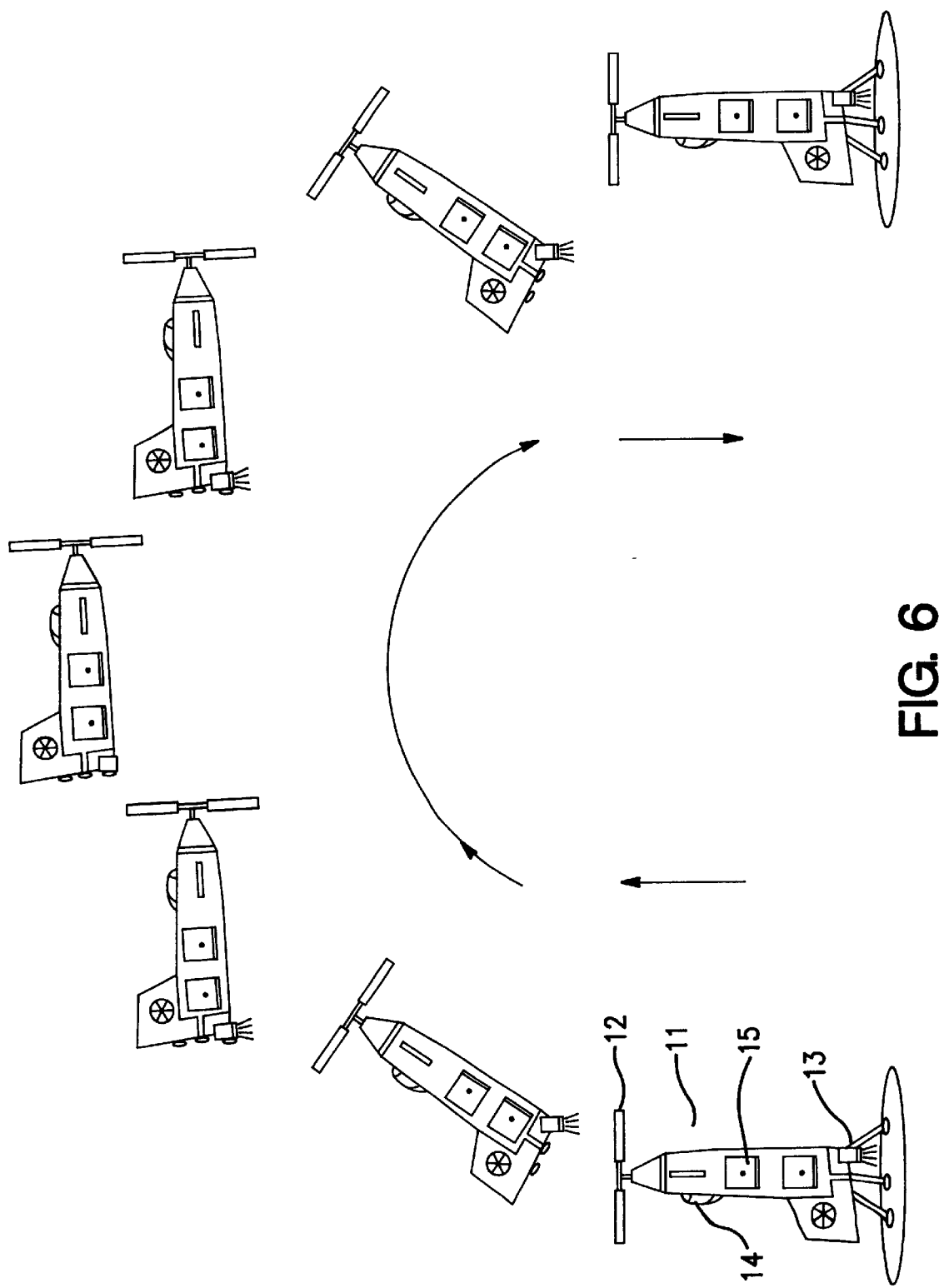

The different flying phases of an aircraft according to the invention are shown in FIG. 6. As it can be noted, take-off occurs with the front portion, or nose, in a vertical position, so that rotors 12 provide vertical thrust and ducted fan propellers 13 are in a vertical direction. During the transition phase, modules 14 and 15 follow the movement of the cabin, so that pilots and passengers, or freight, are not subjected to any effect due to the attitude variation. The same steps, obviously in a reverse order, occur for the transition from horizontal flight to vertical flight.

The present application incorporates by reference International Application PCT/IT98/00356 from which the present application is derived, and U.S. patent application Ser. No. 09/581,318 that is the parent of the present application and that is a National Stage application of the just-noted international application.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A vertical take-off and landing and horizontal flight aircraft, comprising:
   a fuselage with a pair of wings providing lift during horizontal flight;
   at least one main engine carried by said fuselage;
   a rotor system on a nose of said fuselage providing lift during vertical take-off and landing, said rotor system having at least one rotor that is structured and arranged to be stowed in said fuselage during horizontal flight;
   a first pair of ducted fan propellers mounted on respective ones of said pair of wings;
   a second pair of ducted fan propellers mounted adjacent to a tail of said fuselage, said second pair of ducted propellers being tiltable to vary a direction of thrust relative to a longitudinal axis of said fuselage;
   a hydraulic system powered by said at least one main engine, said hydraulic system being connected to and generating propulsive hydraulic power for said rotor system, said first pair of ducted fan propellers, and said second pair of ducted fan propellers; and
   a control system for controlling said hydraulic system, said control system providing propulsive hydraulic power to said rotor system and to said second pair of ducted fan propellers during vertical take-off and landing and not to said first pair of ducted fan propellers during vertical take-off and landing and providing propulsive hydraulic power to said first and second pairs of ducted fan propellers during horizontal flight and not to said rotor system during horizontal flight.

2. The aircraft of claim 1, wherein said at least one main engine comprises two main engines carried by said fuselage.

3. The aircraft of claim 2, wherein said two main engines are carried inside said fuselage.

4. The aircraft of claim 1, wherein said at least one rotor comprises two rotors that are both stowable in said fuselage.

5. A vertical take-off and landing and horizontal flight aircraft, comprising:
   a fuselage with a pair of wings providing lift during horizontal flight;
   at least one main engine carried by said fuselage;
   a rotor system on a nose of said fuselage providing lift during vertical take-off and landing, said rotor system having two counter-rotating rotors that are structured and arranged to be stowed in said fuselage during horizontal flight;
   a first pair of ducted fan propellers mounted on respective ones of said pair of wings;
   a second pair of ducted fan propellers mounted adjacent to a tail of said fuselage;
   a hydraulic system powered by said at least one main engine, said hydraulic system being connected to and generating propulsive hydraulic power for said rotor system, said first pair of ducted fan propellers, and said second pair of ducted fan propellers; and
   a control system for controlling said hydraulic system, said control system providing propulsive hydraulic power to said rotor system and to said second pair of ducted fan propellers during vertical take-off and landing and not to said first pair of ducted fan propellers during vertical take-off and landing and providing propulsive hydraulic power to said first and second pairs of ducted fan propellers during horizontal flight and not to said rotor system during horizontal flight.

6. The aircraft of claim 5, wherein said at least one main engine comprises two main engines carried by said fuselage.

7. The aircraft of claim 6, wherein said two main engines are carried inside said fuselage.

* * * * *

UNITED STATES PATENT AND TRADEMARK OFFICE
CERTIFICATE OF CORRECTION

PATENT NO. : 6,561,455 B2
DATED : May 13, 2002
INVENTOR(S) : Franco Capanna

It is certified that error appears in the above-identified patent and that said Letters Patent is hereby corrected as shown below:

<u>Title page,</u>
Insert Item [30] as follows:
-- [30] Foreign Application Priority Data
Dec. 10, 1997 (IT) ................... RM97A000763 --.

Signed and Sealed this

Ninth Day of September, 2003

JAMES E. ROGAN
*Director of the United States Patent and Trademark Office*